(12) United States Patent
Yamato et al.

(10) Patent No.: US 6,584,580 B1
(45) Date of Patent: Jun. 24, 2003

(54) PROCESSOR AND MULTIPROCESSOR SYSTEM

(75) Inventors: Akihiro Yamato, Hadano (JP); Kei Yamamoto, Zama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/460,519

(22) Filed: Dec. 14, 1999

(30) Foreign Application Priority Data

Dec. 15, 1998 (JP) .............................. 10-355996

(51) Int. Cl.[7] .............................................. G06F 11/00
(52) U.S. Cl. ........................ 714/10; 714/714; 714/11; 714/12
(58) Field of Search ............................. 714/10, 11, 12, 714/23; 711/146

(56) References Cited

U.S. PATENT DOCUMENTS 5,671,231 A * 9/1997 Cooper ..................... 711/146
5,682,516 A * 10/1997 Saragdhar et al. ......... 710/243
6,393,582 B1 * 5/2002 Klecka et al. ............... 714/10
2001/0013089 A1 * 8/2001 Weber ........................ 711/146

* cited by examiner

*Primary Examiner*—Robert Beausoliel
*Assistant Examiner*—Marc M Duncan
(74) *Attorney, Agent, or Firm*—Antonelli, Terry, Stout & Kraus, LLP

(57) ABSTRACT

For use in a multiprocessor system in which a plurality of processors share a main memory via a processor bus, an error processing unit (EU) that determines an error level is provided in each processor. When an L2 cache control unit (SU) that controls an L2 cache in the write-back mode, a bus interface unit (PU), and so on, are normal and snoop processing may be continued, the snoop processing is continued in the processor, in which an error occurred, regardless of whether or not the processor is reset. This prevents the system from going down even when data coherence among L2 caches is lost due to an error that occurs in one of processors.

9 Claims, 6 Drawing Sheets

PROCESSOR AND MULTIPROCESSOR SYSTEM

BACKGROUND OF THE INVENTION

The present invention relates to a processor and a multi-processor technology and, more particularly, to a technology that is applied advantageously to error handing and so on in a tightly-coupled multiprocessor system which allows a plurality of processors to share main memory.

In the field of a information processing technology, a multiprocessor technology is known which divides the processing load among a plurality of processors to increase per-unit-time information processing capabilities and to ensure fault tolerance achieved through processor multiplexing.

When an error occurs in a processor during multiprocessor system operation and the execution of the processor cannot be continued any more, the processor, if duplexed, has an alternate processor that starts re-executing the processing to reduce the possibility of a system failure. However, when each processor of a tightly-coupled multiprocessor system, such as the one shown in FIG. 6, is executing its own program, and especially when the write-back caching mode is used to control the cache, disconnecting a processor, where an unrecoverable error occurred, from the system prevents updated (dirty) data in the cache of the processor from being reflected on the main memory. In this case, it is necessary in most cases to bring the system down because of data inconsistency.

To avoid this technical problem, Japanese Patent Laid-Open Publication JP-A-10-105527, for example, discloses a method which prevents the system from going down. To do so, an external cache and a special controller are provided in the processor bus to include therein all the data stored in the internal cache memories in the processors to always make the most recent data visible to all the processors. However, this method requires extra components, such as the external cache and the controller, involves extra costs and, in addition, does not solve the problem as the number of processors increases.

Because more and more processors will be included in a multiprocessor system in future to improve system performance, a need exists for a low-cost method for preventing a system failure.

A tightly-coupled multiprocessor system must be stopped when an error occurs in one of the processors and instruction execution cannot be continued any more. On of the reasons for stopping the system is that, when the processors employ the write-back caching mode and the cache of the processor where the error occurred contains the most recent data not yet reflected on the main memory, disconnecting the processor from the system prevents the most recent data from being passed to the main memory and other processors.

Another reason is that, if the processor where the error occurred cannot respond to a request from a normal processor, there is a possibility that the normal processor will be stopped.

SUMMARY OF THE INVENTION

It is an object of the present invention, for use in a tightly-coupled multiprocessor system composed of a plurality of processors each containing a write-back cache memory, to provide a low-cost processor which has no extra function added to it and which prevents an error in one of the processors from causing the system to go down.

It is another object of the present invention, for use in a tightly-coupled multiprocessor system, to provide a processor which has no extra function added to it and which minimizes the effect of snoop processing.

The present invention provides an error processing technology for use in a multiprocessor system. When a fatal error occurs and instruction execution cannot be continued in one of the processors, the processor checks the error level. Although the instruction in that processor cannot be processed, the processor continues operation as long as snoop response processing, such as invalidating cache lines (purging) or writing dirty lines into the main memory, can be executed. This allows other normal processors to continue operation and prevents the system from stopping.

That is, according to present invention, each processor of a tightly-coupled multiprocessor system comprises means for checking the location and the level of an error that occurred in the processor and means for determining, although instruction execution cannot be continued, whether or not snoop processing, such as purging or moving dirty lines into main memory, can be continued.

More specifically, when an error occurs in a processor cache composed of a plurality of hierarchical levels, the processor according to the present invention checks if the cache at a hierarchical level at which data coherence is maintained works properly (a cache hierarchical level at which dirty lines are held). In most cases, the cache at the lowest level uses the write-back caching mode, and the caches at higher levels use the write-through caching mode. In this case, even if an error occurs in a cache at some other hierarchical level, means for disconnecting the cache at that level from the snoop operation is provided to allow the processor to respond to a snoop request sent via the bus.

When an error occurs in the processor, the means described above checks the location and the level of the error. If instruction processing cannot be continued, the means checks if the snoop response processing described above can be performed. If the snoop response processing can be continued, the processor responds to a snoop request sent from the bus even when instruction execution in that processor cannot be continued, thus preventing the system from going down.

DESCRIPTION OF THE EMBODIMENTS

An embodiment of the present invention will be described in detail with reference to the attached drawings.

Figure 1:
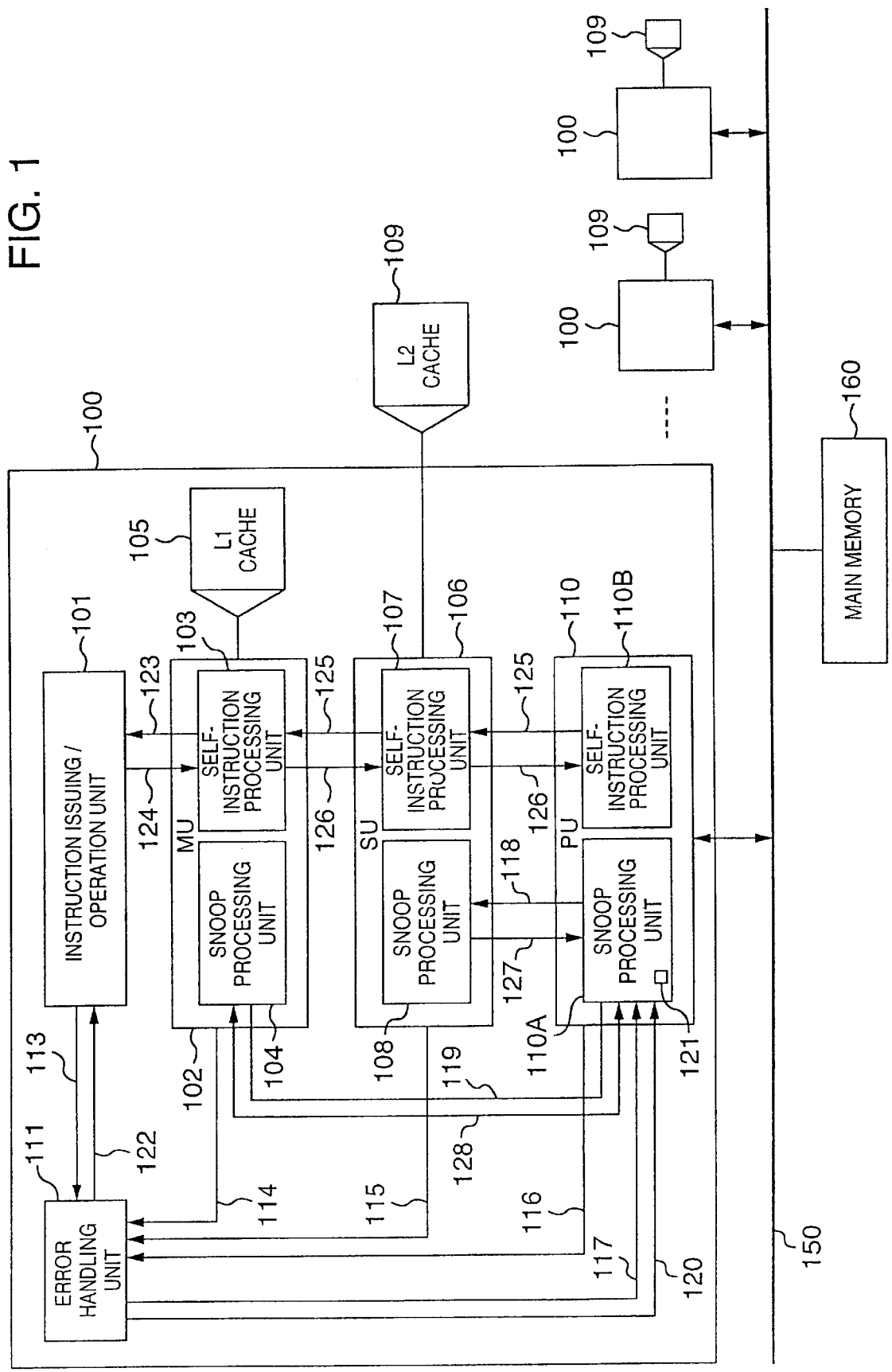
FIG. 1 is a block diagram showing an example of the internal configuration of a processor of a multiprocessor system used in an embodiment of the present invention.

FIG. 1 is a block diagram showing an example of the internal configuration of one of the processors of a multiprocessor system used in the embodiment according to the present invention.

The multiprocessor system in this embodiment is a tightly-coupled multiprocessor system in which a plurality of processors 100 share a main memory 160 via a processor bus 150.

Each processor 100 comprises an instruction issuing/operation unit (IU) 101 that issues an instruction and executes operation, an L1 cache control unit (MU) 102, an L1 cache 105, an L2 cache control unit (SU) 106, an L2 cache 109, a bus interface unit (PU) 110 that issues a bus request to the processor bus 150 and performs a snoop from the processor bus 150, and an error processing unit (EU) 111 that controls error processing.

The MU 102 that controls the L1 cache 105 comprises a snoop processing unit 104 and a self-instruction processing unit 103, the SU 106 that control the L2 cache 109 comprises a snoop processing unit 108 and a self-instruction processing unit 107, and the PU 110. comprises a snoop processing unit 110A and a self-instruction processing unit 110B.

Data is transferred between each two levels of the memory hierarchy, composed of the main memory 160, L2 cache 109, and L1 cache 105, and between this hierarchy and the IU 101, via a data transfer bus 123, a data transfer bus 125, and the processor bus 150 in response to a data transfer request signal 124 and a data transfer request signal 126 that are sent from a higher hierarchical level to a lower hierarchical level.

Data is written into the L1 cache 105 in the write-through caching mode, while data is written into the L2 cache 109 in the write-back caching mode. Therefore, when the IU 101 executes a store instruction to write data into the main memory 160, it writes data into both the L1 cache 105 and the L2 cache 109 if the L1 cache 105 contains a write destination line, and writes data into the L2 cache 109, but not into the L1 cache 105, if the L1 cache 105 does not contain a write destination line. Thus, updated data (dirty data) is stored only in the L2 cache 109 unless cache lines are replaced or an explicit dirty line write request is generated. For this reason, the coherence check through snoop operation is performed only for the L2 cache 109 to maintain coherence of the caches of the plurality of processors.

When a snoop request, such as a purge request or a dirty line write request, is received from some other processor via the processor bus 150, the PU 110 issues a snoop processing request 118 and a snoop processing request 119 to the SU 106 and the MU 102, respectively. At this time, because dirty lines are stored only in the L2 cache 109, the dirty line write request is issued only to the SU 106.

When the IU 101, MU 102, SU 106, and PU 110 detect an error, they report an error generation and the error level to the EU 111 using an error generation report signal 113, an error generation report signal 114, an error generation report signal 115, and an error generation report signal 116 which are special interface signals.

The error level described above is classified roughly into three: non-serious error (level 0), serious error (level 1), and fatal error (levels 2–3). The EU 111 comprises the function to determine the error level and the logic for performing each error level processing.

Figure 3:
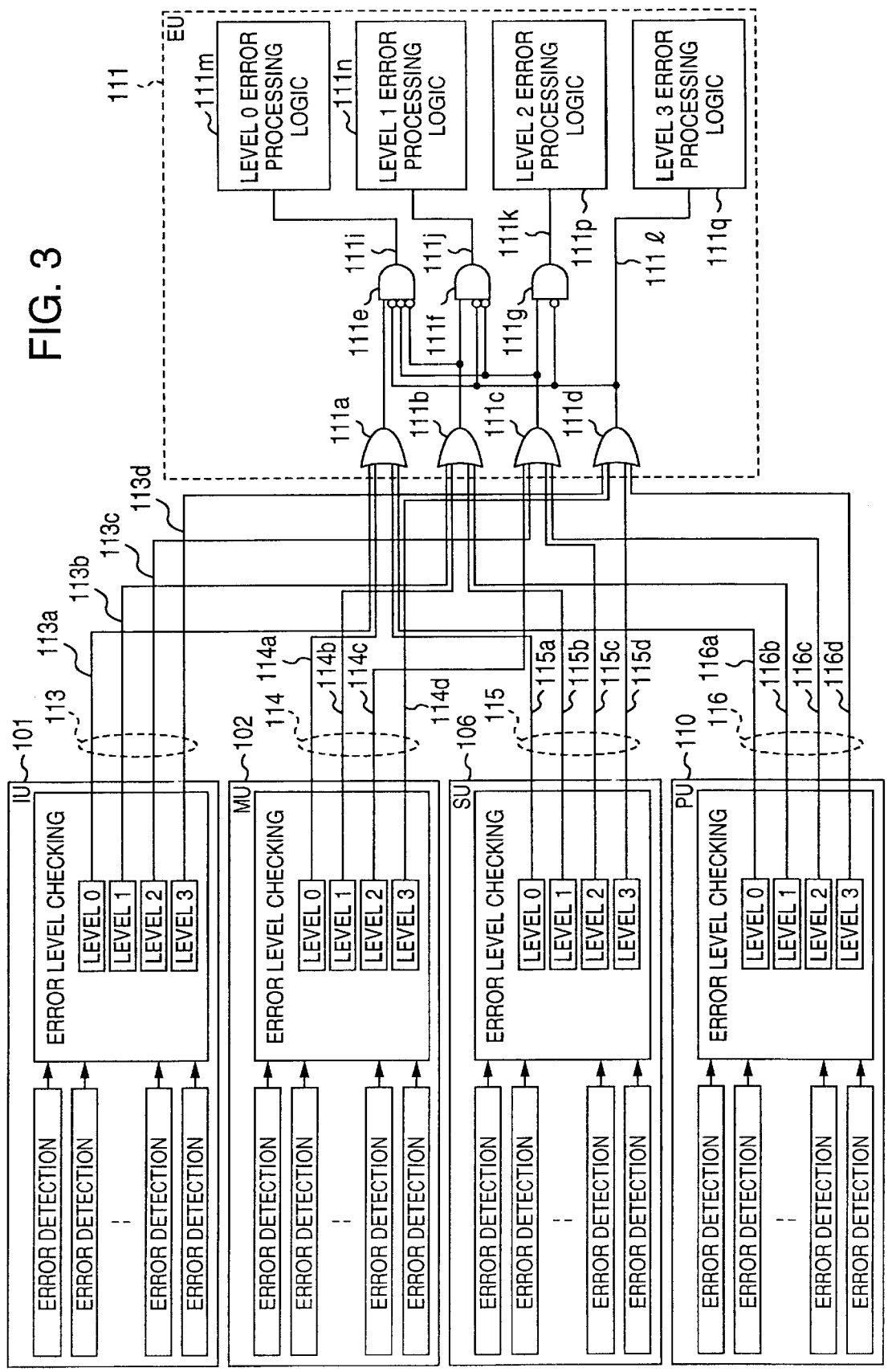
FIG. 3 is a conceptual diagram showing an example of an error processing unit provided in a processor of the multi-processor system used in the embodiment of the present invention.

That is, as shown in FIG. 3, each of error generation report signals 113–116 comprises a plurality of level lines, that is, error level 0 to error level 3, each indicating one of four states. More specifically, they are level lines 113a–113d, level lines 114a–114d, level lines 115a–115d, and level lines 116a–116d.

In the EU 111 are provided, an OR gate 111a, an AND gate 111e, a level 0 determination output 111i, and a level 0 error processing logic 111m corresponding to level 0, an OR gate 111b, an AND gate 111f, a level 1 determination output 111j, and a level 1 error processing logic 111n corresponding to level 1, an OR gate 111c, an AND gate 111g, a level 2 determination output 111k, and a level 2 error processing logic 111p corresponding to level 2, and an OR gate 111d, a level 3 determination output 111l, and a level 3 error processing logic 111q corresponding to level 3.

When one of level lines 113d–116d, which indicate that a level 3 error has occurred, is "1", the OR gate 111d, which processes the level 3 error signals, sets the level 3 determination output 111l to "1" to start the level 3 error processing logic 111q. In addition, the level 3 determination output 111l is inverted and is sent to the AND gates, 111e–111g, of lower error levels.

Similarly, the output from the level 2 OR gate 111c is inverted and sent to the lower level AND gates 111e–111f. It is output as level 2 determination output 111k via the AND gate 111g.

Similarly, the output from the level 1 OR gate 111b is inverted and sent to the lower level AND gate 111e. It is output as level 1 determination output 111j via the AND gate 111f.

The output from the level 0 OR gate 111a is output as the level 0 determination output 111i via the AND gate 111e.

Therefore, when a plurality of errors, level 0 to level 3, occur at the same time, a higher level error processing logic is started in the EU 111.

A non-serious error (level 0) refers to an error that can be recovered without affecting instruction execution. For example, a one-bit error that may occur when data is read from the RAM constituting the cache is a non-serious error.

A serious error (level 1) refers to an error that requires the re-execution of an instruction. For example, a parity error that may occur as a result of operation or an error that occur when an invalid operation result is written into a register is a serious error.

A fatal error (level 2) refers to an error that prevents the re-execution of an instruction or a serious error for which error recovery handling cannot be executed. When an error at this level occurs, the processor must be disconnected. In addition, when snoop processing cannot be continued (level 3), there is a possibility that dirty lines cannot be written to the main memory to maintain data coherence with other processors. So, when an error at this level occurs, the system is stopped.

Each unit determines the level of an error that is detected in the unit. For example, when the MU 102 or the SU 106 detects a one-bit error in data read from the L1 cache 105 or the L2 cache 109, respectively, it informs the EU 111 that a "level 0 error" has occurred. When the MU 102 detects a two-bit error in data read from the L1 cache 105, it informs the EU 111 that a "level 2 error" has occurred because this error cannot be recovered. When the SU 106 detects a two-bit error in data read from the L2 cache 109, it informs the EU 111 that a "level 3 error", rather than a "level 2 error", has occurred because snoop processing cannot be executed and therefore a coherence check cannot be performed.

Figure 5:
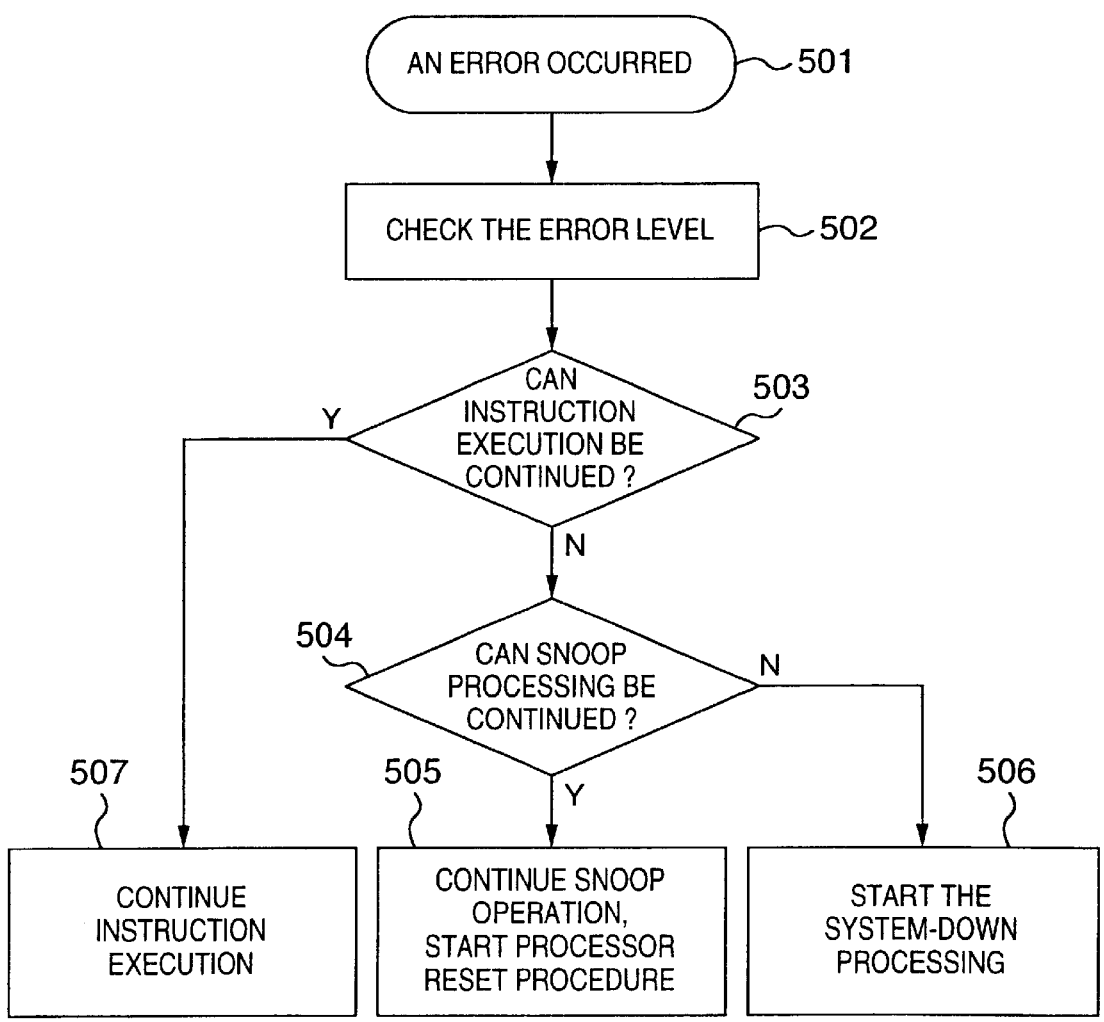
FIG. 5 is a flowchart showing an example of the error processing unit provided in a processor of the multiprocessor system used in an embodiment of the present invention.
Figure 6:
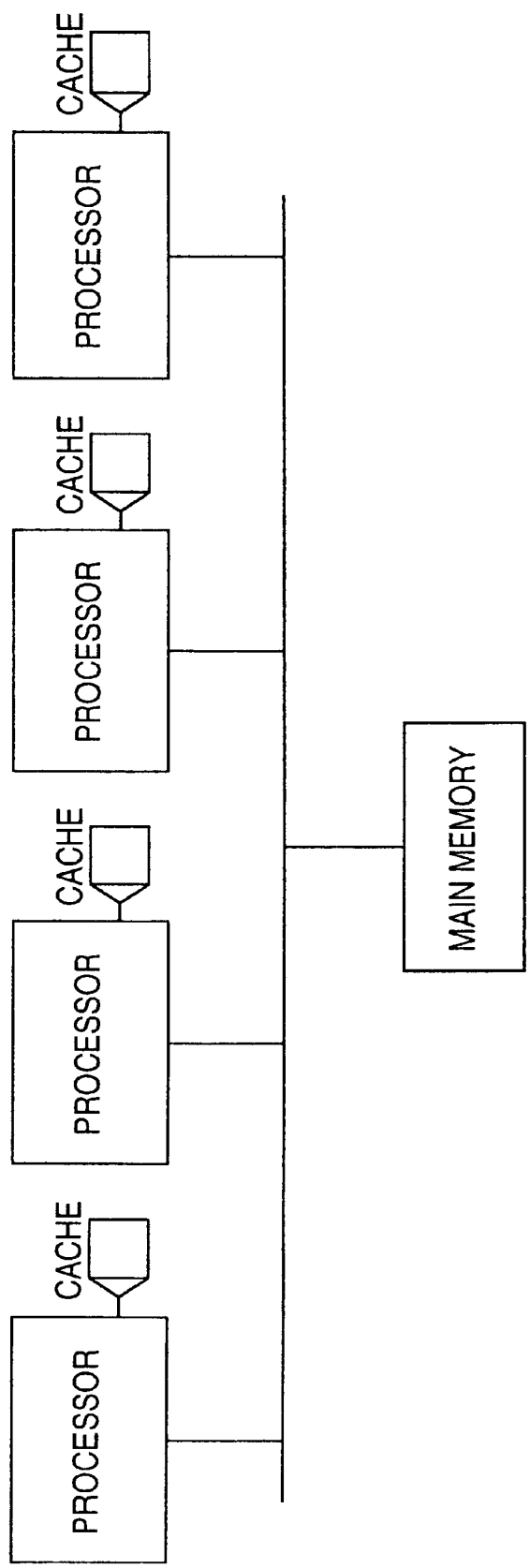
FIG. 6 is a conceptual diagram showing the configuration of a tightly-coupled multiprocessor system.

In response to information indicating that an error has occurred, the EU 111 executes error determination processing such as the one shown in the flowchart in FIG. 5. The following describes this error determination processing.

Upon receiving information that an error has occurred (step 501), the EU 111 checks the error level to see if instruction execution can be continued (steps 502 and 503). More specifically, when the error level is 0, the EU 111 determines that instruction execution can be continued (step 507); when the error level is 1 or higher, the EU 111 determines that instruction execution cannot be continued.

When instruction execution cannot be continued, the EU 111 checks if snoop processing can be continued (step 504). Whether or not snoop processing can be continued is determined by checking whether or not the informed error level is 2 or lower. It should be noted that a plurality of errors at different error levels may be reported at the same time because, as described in FIG. 3, the EU 111 checks the error level priority and reports only the highest-level error.

If, as a result of the above checking, the EU 111 determines that snoop processing cannot be continued, it starts the system failure sequence (step 506). On the other hand, if the EU 111 determines that snoop processing can be continued, the EU 111 issues a snoop operation switch request 117 to the PU 110 to switch the snoop operation to an error-time snoop operation (step 505).

The snoop operation switch request 117 causes the PU 110 to send a snoop processing request received via the processor bus 150, such as a dirty line write request or a purge request, only to the SU 106. In addition, the snoop operation switch request 117 causes the PU 110 to stop issuing a snoop processing request 119 to the MU 102 to disconnect it from the snoop processing. This is because other processors do not require data stored in the L1 cache 105 in which there is no dirty line and because data stored in the 105 is not accessed since execution of an instruction from this processor is not continued any more.

Figure 2:
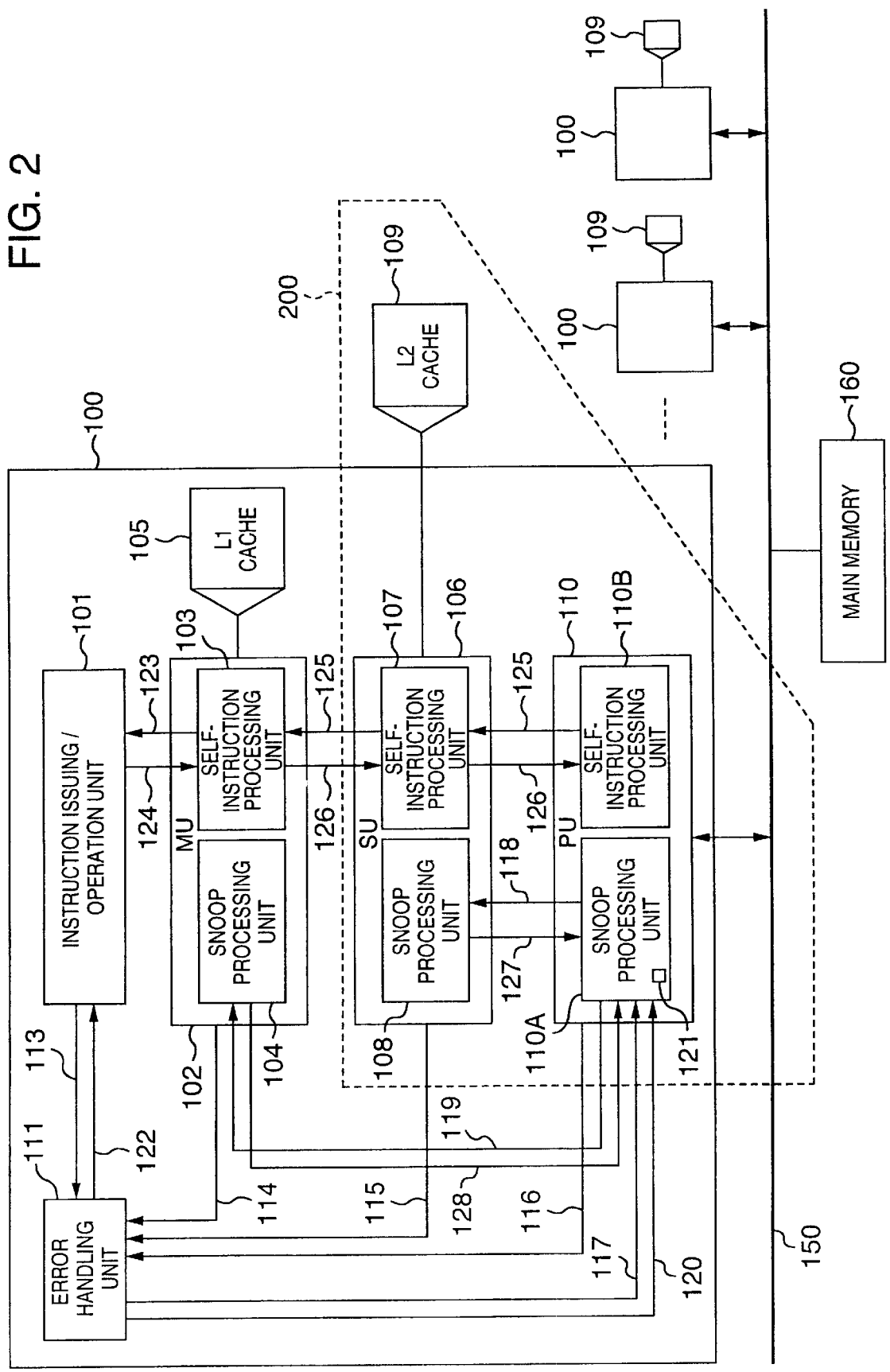
FIG. 2 is a conceptual diagram showing an example of the operation of a processor of the multiprocessor system used in the embodiment of the present invention.

For the reason described above, disconnecting the L1 cache 105 from the snoop operation and limiting the snoop processing only to a snoop processing execution range 200 indicated by the dotted line in FIG. 2, as shown in the example in FIG. 2, do not generate any problem. And, even if the L1 cache 105 is put in the inoperable state by switching the operation as described above, the snoop processing can still be continued. This is done by suppressing the snoop processing request 119 to be issued to the MU 102, which controls the L1 cache 105, in order to disconnect the L1 cache 105 from the snoop processing.

Figure 4:
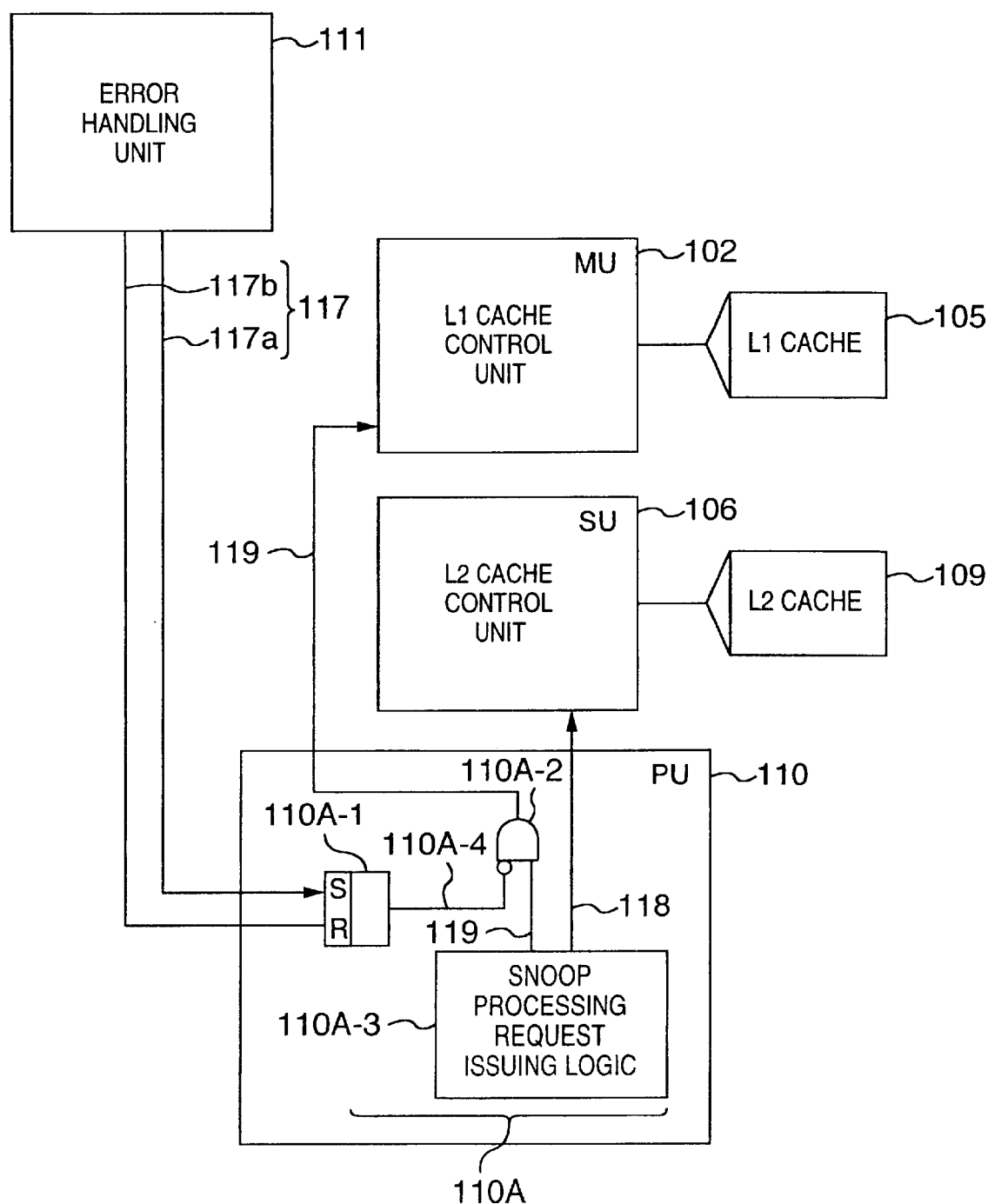
FIG. 4 is a conceptual diagram showing an example of a mechanism, provided in a processor of the multiprocessor system used in the embodiment of the present invention, for disconnecting a cache from snoop processing.

FIG. 4 shows, more in detail, an example of the above-described mechanism, which is provided in the PU 110, for disconnecting the L1 cache 105 from the snoop operation.

The snoop operation switch request 117 comprises a request set request 117*a* and a request reset request 117*b*. When the request set request 117*a* is issued from the EU 111 to the snoop processing unit 110A of the PU 110, the PU 110 sets "1" in a snoop switch flag latch 110A-1 (1-bit latch). When this snoop switch flag latch 110A-1 is set, the snoop processing request 119 issued from a snoop request issue logic 110A-3 to the MU 102 is always set to the value of 0 by an AND gate 110A-2. As a result, all the snoop processing requests from the PU 110 to the MU 102 are suppressed. This mechanism enables the L1 cache to be disconnected. Note that issuing the request reset request 117*b* to reset the snoop switch flag latch 110A-1 allows the disconnected L1 cache 105 to be connected.

After that, the EU 111 issues a cancel signal 122 to the IU 101 to cancel all the instructions being executed in the processor. In response to this signal, the IU 101 cancels all the instructions being executed. After that, the processor 100 executes the reset operation. Before starting the reset operation, the EU 111 issues a retry mode set request 120 to the PU 110 to prompt other processors to re-issue (retry) snoop requests that will be received during the reset operation. In response to this request, the PU 110 sets a snoop retry response flag 121 in the PU 110. Because the snoop retry response flag 121, once set, is not cleared when the processor 100 is reset, the retry request is unconditionally returned in response to a snoop request from the processor bus 150 even when the reset operation is being executed. While the snoop retry response flag 121 of the processor 100 in which an error occurred is set, other processors cannot complete a request issued to the processor bus 150. They can complete the request after the reset operation is finished and the snoop retry response flag 121 is cleared.

The above procedure allows the processor 100 in which an error occurred to execute the normal snoop operation from the moment the error occurred to the moment the snoop retry response flag 121 is set. While executing the reset operation with the snoop retry response flag 121 on, the processor 100 returns a retry response in response to a snoop request. After the reset operation is completed and the snoop retry response flag 121 is reset, the normal snoop operation may be executed.

After the resetting of the processor 100 is completed and before an instruction is executed, all the data in the L1 cache 105 must be initialized. This is because the snoop request is not sent from the PU 110 to the MU 102 after the MU 102 is disconnected and therefore the data in the L1 cache 105 may have been updated by other processors.

As described above, according to the processor 100 in this embodiment and the multiprocessor system composed of those processors, the EU 111 contained in the processor 100, in which an error occurred, checks the error level. If, as a result of the checking, it is found that the snoop processing may be executed for the L2 cache 109 which may contain dirty lines, the snoop operation is continued. This configuration allows, for example, the dirty lines in the L2 cache 109 of the processor in which the error occurred to be reflected on the main memory 160.

That is, even when an error occurs in one of the processors, the processor 100 and the multiprocessor system in this embodiment enable the system operation to be continued without having to stop the whole system, thus increasing the reliability of the multiprocessor system.

Furthermore, the processor and the multiprocessor system in this embodiment eliminate the need for providing an additional controller or a memory external to the processor 100, reducing the cost in building the multiprocessor system.

In addition, even when an error occurs, the whole multiprocessor system need not be stopped. This improves the availability of an individual processor 100 and the multiprocessor system composed of those processors.

While the preferred form of the present invention has been described, it is to be understood that the present invention is not limited to the embodiment but that modifications will be apparent to those skilled in the art without departing from the spirit of the present invention.

For example, the cache memory hierarchy need not always be a two-level hierarchy. Instead, the hierarchy may be a three-or-more level or a one-level hierarchy.

What is claimed is:

1. A processor including a processing unit which issues an instruction and performs operation, a memory control unit which controls a cache memory containing a copy of data stored in a main memory, and a snoop processing unit which, when said main memory is shared with other processors, performs snoop processing to make contents of cache memories coherent, each of said cache memories being controlled by the processor and by each of the other processors, said processor comprising:

an error determination unit which checks, when an error occurs in the processor disabling an instruction execution, if said snoop processing can be performed; and a control unit which continues said snoop processing if, as a result of said checking, said snoop processing can be performed.

2. The processor according to claim 1, wherein said control unit performs a reset operation of said processor while continuing said snoop processing.

3. A multiprocessor system comprising a main memory, a plurality of processors sharing said main memory, and a bus connecting said main memory and said plurality of processors, each of said plurality of processors comprising:

a processing unit which issues an instruction and performs operation;

a cache memory containing a copy of data stored in said main memory;

a memory control unit which controls said cache memory;

a snoop processing unit which performs snoop processing to make contents of cache memories coherent, each of said cache memories being provided in the processor and each of other processors;

an error determination unit which checks, when an error occurs in the processor disabling an instruction execution, if said snoop processing can be performed; and a control unit which continues said snoop processing if, as a result of said checking, said snoop processing can be performed.

4. The multiprocessor system according to claim 3 wherein said cache memory comprises a first cache memory hierarchically placed near said processing unit and controlled in a write-through mode and a second cache memory hierarchically placed near said main memory and controlled in a write-back mode.

5. The multiprocessor system according to claim 4 wherein said control unit disconnects said first cache memory from said snoop processing unit to continue said snoop processing when said processing unit becomes inoperable.

6. The multiprocessor system according to claim 3 wherein said error determination unit checks a level of the detected error and performs processing corresponding to each error level.

7. A processor including an operation logic unit which performs data processing, a cache memory temporarily storing therein data which is generated by said operation logic unit and which is to be stored into a main memory, and a snoop processing logic which, when said main memory is shared with other processors, performs snoop processing to make contents of each said cache memory logically consistent among the processors, comprising:

an error determination logic which checks if said snoop processing can be performed when an error occurs in said processor disabling an instruction execution; and a control logic which performs a reset operation of said processor while continuing said snoop processing if said snoop processing can be performed when the error occurs in said processor.

8. The processor according to claim 7 wherein said cache memory comprises a first cache memory placed near said operation logic unit and controlled in a write-through mode and a second cache memory placed near said main memory and controlled in a write-back mode and wherein said first cache memory is disconnected from said snoop processing logic to continue said snoop processing when said operation logic unit becomes inoperable.

9. The multiprocessor system comprising a main memory and a plurality of processors sharing said main memory, each of said processors being the processor according to claim 7.

* * * * *